FRANCIS M. SIMPSON.

Improvement in Riding Saddles.

No. 121,818.             Patented Dec. 12, 1871.

Witnesses:           Inventor:
A. W. Almqvist          Francis M. Simpson
Francis McArdle      Per Attorneys.

AM. PHOTO-LITHOGRAPHIC CO. N.Y. (OSBORNE'S PROCESS.)

UNITED STATES PATENT OFFICE.

FRANCIS M. SIMPSON, OF PITTSVILLE, MISSOURI.

IMPROVEMENT IN RIDING-SADDLES.

Specification forming part of Letters Patent No. 121,818, dated December 12, 1871.

*To all whom it may concern:*

Be it known that I, FRANCIS M. SIMPSON, of Pittsville, in the county of Johnson and State of Missouri, have invented a new and useful Improvement in Riding-Saddles; and I do hereby declare that the following is a full, clear, and exact description thereof, which will enable others skilled in the art to make and use the same, reference being had to the accompanying drawing forming part of this specification, in which—

Figure 1:
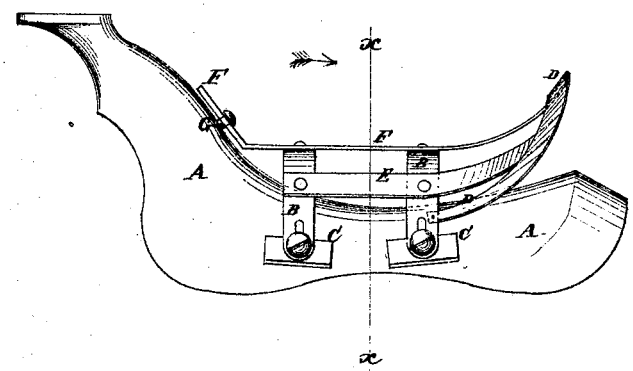
Figure 2:
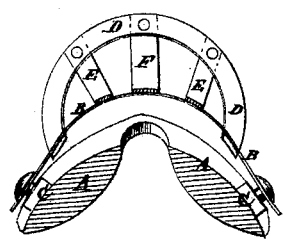

Figure 1 is a side view of my improved spring-seat as attached to a saddle-tree. Fig. 2 is a detail cross-section of the same taken through the line $x\,x$, Fig. 1.

Similar letters of reference indicate corresponding parts.

The object of my invention is to provide a saddle having springs so arranged as to better secure the comfort of equestrians than those of an analogous character heretofore in use. The invention consists in the peculiar arrangement of the springs and bars composing the seat of the saddle, as hereinafter specified.

A represents the saddle-tree, the middle part of which is slotted longitudinally to allow the air to have free access to the horse's back. B are two curved springs passing over the saddle-tree A transversely, as shown in Figs. 1 and 2. The ends of the springs B rest upon the plate C attached to the lower parts of the sides of the saddle-tree A, to which they are secured by screws or rivets which pass through longitudinal slots in the ends of the said springs B and into the plates C, so that the springs may have an up-and-down movement upon the said plates, and at the same time may be firmly secured to them. To the rear spring B, near its ends, are securely riveted the ends of the bent bar or bow D, to which are securely riveted the rear ends of the side bars E and central bar F. The bars E F are securely riveted to the springs B, as shown in Fig. 1. The forward end of the central bar F projects, and is bent or inclined upward along the pommel of the saddle, and is slotted longitudinally, to receive the screw or rivet by which it is secured to the plate G attached to said pommel, so that the bar F, while held securely in place, may yet be free to move up and down with the springs B. It will be observed that the springs B B, more especially the rear one, form a fulcrum for the longitudinal bars E F, so that the weight of the rider applied to the rear part of said bars, and the cantle-bow D, will increase the elasticity or spring of the seat. Thus a very pleasurable effect is secured, independently of the direct vertical movement of the seat.

Having thus described my invention, I claim as new and desire to secure by Letters Patent—

The bars E F and bow D attached to and arranged with the springs B B connected with the saddle-tree A A, as shown and described, whereby said parts are adapted to operate as specified.

FRANCIS M. SIMPSON.

Witnesses:
WM. OWEN,
DANIEL W. ROGERS. (72)